(12) United States Patent
Lim et al.

(10) Patent No.: US 11,808,845 B2
(45) Date of Patent: Nov. 7, 2023

(54) RADAR DEVICE FOR VEHICLE

(71) Applicant: HYUNDAI MOBIS CO., LTD., Seoul (KR)

(72) Inventors: Jung Sub Lim, Yongin-si (KR); Han Seong Yu, Yongin-si (KR); Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 286 days.

(21) Appl. No.: 17/230,931

(22) Filed: Apr. 14, 2021

(65) Prior Publication Data

US 2021/0382168 A1     Dec. 9, 2021

(30) Foreign Application Priority Data

Jun. 9, 2020   (KR) .......................... 10-2020-0069655

(51) Int. Cl.
*G01S 13/931* (2020.01)
*G01S 7/288* (2006.01)
*G01S 7/40* (2006.01)

(52) U.S. Cl.
CPC .......... *G01S 13/931* (2013.01); *G01S 7/2883* (2021.05); *G01S 7/4026* (2013.01); *G01S 2013/93277* (2020.01)

(58) Field of Classification Search
CPC ......... G01S 13/931; G01S 2013/93277; G01S 7/2883; G01S 7/4026
See application file for complete search history.

(56) References Cited

U.S. PATENT DOCUMENTS

| | | | | |
|---|---|---|---|---|
| 5,008,678 A | * | 4/1991 | Herman | G01S 13/931 342/158 |
| 5,313,213 A | * | 5/1994 | Neumann | H01Q 1/3233 343/711 |
| 5,446,470 A | * | 8/1995 | Avignon | B60Q 1/0023 343/712 |
| 5,467,072 A | * | 11/1995 | Michael | G01S 13/931 340/901 |
| 5,963,172 A | * | 10/1999 | Pfizenmaier | G01S 7/03 343/712 |

(Continued)

FOREIGN PATENT DOCUMENTS

| | | |
|---|---|---|
| JP | H 06-69708 | 3/1994 |
| JP | 2007-174390 | 7/2007 |

(Continued)

OTHER PUBLICATIONS

Japanese Office Action issued in JP 2021-076494 dated Mar. 29, 2022.

(Continued)

*Primary Examiner* — Peter M Bythrow
(74) *Attorney, Agent, or Firm* — DLA PIPER LLP (US)

(57) ABSTRACT

A radar device for a vehicle, the radar device including: an antenna provided on an inner surface of a lamp for a vehicle and configured to transmit and receive electromagnetic waves; and a signal processing module provided in the lamp and configured to process a signal received by the antenna, such that it is possible to obtain an advantageous effect of simplifying a structure and improving a degree of design freedom and spatial utilization.

11 Claims, 8 Drawing Sheets

(56) References Cited

U.S. PATENT DOCUMENTS

| | | | | |
|---|---|---|---|---|
| 6,380,883 | B1* | 4/2002 | Bell | G01S 13/931 342/70 |
| 6,885,349 | B2* | 4/2005 | Hickel | H01Q 1/3291 343/711 |
| 7,535,406 | B2* | 5/2009 | Teranishi | G01S 17/931 342/70 |
| 8,310,404 | B2* | 11/2012 | Kishimoto | G08G 1/095 343/720 |
| 8,803,728 | B2* | 8/2014 | Yonemoto | H01Q 1/3225 362/539 |
| 8,922,435 | B2* | 12/2014 | Fontecchio | H01Q 9/16 343/700 MS |
| 9,647,325 | B2* | 5/2017 | Geary | H01Q 21/065 |
| 2003/0034926 | A1* | 2/2003 | Veerasamy | H01Q 1/36 343/711 |
| 2005/0151698 | A1* | 7/2005 | Mohamadi | H01Q 1/38 343/700 MS |
| 2008/0158045 | A1* | 7/2008 | Teranishi | B60Q 1/076 342/70 |
| 2016/0064806 | A1* | 3/2016 | Geary | H01Q 1/3233 343/713 |
| 2017/0098888 | A1* | 4/2017 | Geary | H01Q 1/3283 |
| 2020/0101887 | A1* | 4/2020 | Cha | B60Q 1/0023 |
| 2020/0101889 | A1* | 4/2020 | Iwai | B60Q 1/04 |
| 2020/0386381 | A1* | 12/2020 | Aizawa | F21S 43/50 |
| 2021/0387563 | A1* | 12/2021 | Junghähnel | G01S 13/931 |
| 2022/0134939 | A1* | 5/2022 | Maruyama | F21S 41/275 342/175 |
| 2022/0352622 | A1* | 11/2022 | Choudhury | H04W 4/40 |

FOREIGN PATENT DOCUMENTS

| | | |
|---|---|---|
| JP | 2008-186741 | 8/2008 |
| JP | 2010-154182 | 7/2010 |
| JP | 2017-517993 | 6/2017 |
| JP | 2017-147487 | 8/2017 |
| JP | 2018-182734 | 11/2018 |
| JP | 2020-051975 | 4/2020 |
| JP | 2020-056788 | 4/2020 |
| WO | WO 2020/079060 | 4/2020 |
| WO | WO 2020/179447 | 9/2020 |

OTHER PUBLICATIONS

English Language Abstract of JP 2017-147487 published Aug. 24, 2017.

English Language Abstract of JP 2018-182734 published Nov. 15, 2018.

English Language Abstract of JP 2007-174390 published Jul. 5, 2007.

English Language Abstract of JP 2020-056788 published Apr. 9, 2020.

English Language Abstract of JP 2020-051975 published Apr. 2, 2020.

English Language Abstract of JPH 06-69708 published Mar. 11, 1994.

English Language Abstract of WO 2020/179447 published Sep. 10, 2020.

Extended European Search Report dated Sep. 17, 2021 issued in EP 21169185.2.

Japanese Decision to Grant a Patent issued in JP 2021-076494 dated Aug. 2, 2022.

English Language Abstract of JP 2008-186741 published Aug. 14, 2008.

English Language Abstract of JP 2010-154182 published Jul. 8, 2010.

English Language Abstract of JP 2017-517993 published Jun. 29, 2017.

Chinese Office Action issued in CN 2021105131894 dated Jun. 15, 2023.

* cited by examiner

RADAR DEVICE FOR VEHICLE

CROSS-REFERENCE TO RELATED APPLICATION

This application claims priority to and the benefit of Korean Patent Application No. 10-2020-0069655 filed in the Korean Intellectual Property Office on Jun. 9, 2020, the entire contents of which are incorporated herein by reference.

TECHNICAL FIELD

The present disclosure relates to a radar device for a vehicle, and more particularly, to a radar device for a vehicle, which may have a simplified structure and improve a degree of design freedom and spatial utilization.

BACKGROUND ART

Radar (radio detecting and ranging) may find a position of a peripheral object by generating electromagnetic waves, transmitting the electromagnetic waves to the object, and identifying a distance, a direction, and an altitude of the object based on the electromagnetic waves reflected by the object.

The radar may be broadly classified into continuous wave radar and pulse wave radar in accordance with shapes of radio waves.

As the continuous wave radar, there are Doppler radar, frequency modulated continuous wave (FMCVV) radar, and high-speed ramping FMCW (HFMCVV) radar. As the pulse wave radar, there are pulse Doppler radar and pulse compression radar.

Recently, there is an increasing demand for high-resolution radar for detecting an object within several tens of meters using a millimeter wave band or a sub-millimeter wave band, and as a result, research is being continuously conducted on the high-resolution radar.

The high-resolution radar capable of determining or analyzing a distance between objects disposed at a short distance is widely used for industrial and military purpose, and the high-resolution radar is also used for a vehicle in real life.

The radar for a vehicle is an essential technology required to implement an intelligent transport system. The radar for a vehicle has been developed for the purpose of preventing accidents that may occur due to poor weather conditions or drivers' carelessness by detecting movements of other vehicles or objects which are moving or stationary. The radar for a vehicle is a representative system (radar system) capable of being applied to an autonomous vehicle.

However, in the related art, because an antenna module, which constitutes the radar, needs to be separately manufactured and then mounted in the vehicle, there is a problem in that a structure of the radar is complicated and a degree of design freedom and spatial utilization deteriorate.

In addition, in the related art, because the radar needs to be mounted to be exposed to the outside in order to prevent a deterioration in sensing accuracy caused by a metallic component or a metallic paint layer provided on a front portion of the radar, there is a problem in that a mounting position of the radar is restricted and design characteristics of the vehicle deteriorate due to the exposure of the radar to the outside. Moreover, in the related art, because the radar needs to be mounted on a bumper or a front grill of the vehicle, there is concern that the radar is easily damaged in the event of a rear-end collision.

Therefore, recently, various types of research are conducted to simplify the structure of the radar and improve a degree of design freedom and spatial utilization, but the research result is still insufficient. Accordingly, there is a need for development of a radar device for a vehicle, which may have a simplified structure and improve a degree of design freedom and spatial utilization.

SUMMARY OF THE INVENTION

The present disclosure has been made in an effort to provide a radar device for a vehicle, which may have a simplified structure and improve a degree of design freedom and spatial utilization.

The present disclosure has also been made in an effort to enable radar to be mounted in a lamp for a vehicle.

The present disclosure has also been made in an effort to prevent a deterioration in design characteristics of a lamp for a vehicle, improve marketability, and enhance consumer satisfaction.

The object to be achieved by the embodiment is not limited to the above-mentioned objects, but also includes objects or effects that may be recognized from the solutions or the embodiments described below.

In one aspect, the present disclosure provides a radar device for a vehicle, the radar device including: an antenna provided on an inner surface of a lamp for a vehicle and configured to transmit and receive electromagnetic waves; and a signal processing module provided in the lamp for a vehicle and configured to process a signal received by the antenna.

This is to simplify a structure of the radar device for a vehicle and improve a degree of design freedom and spatial utilization.

That is, in the related art, because an antenna module, which constitutes the radar, needs to be separately manufactured and then mounted in the vehicle, there is a problem in that a structure of the radar is complicated and a degree of design freedom and spatial utilization deteriorate. In addition, in the related art, because the radar needs to be mounted to be exposed to the outside in order to prevent a deterioration in sensing accuracy caused by a metallic component or a metallic paint layer provided on a front portion of the radar, there is a problem in that a mounting position of the radar is restricted and design characteristics of the vehicle deteriorate due to the exposure of the radar to the outside.

However, according to the embodiment of the present disclosure, the antenna is provided on the inner surface of the lamp for a vehicle, and as a result, it is possible to obtain an advantageous effect of minimizing a space required to mount the radar and improving the degree of design freedom and spatial utilization.

According to the embodiment of the present disclosure, the lamp may include: a light source configured to generate light; and an outer lens provided in front of the light source and configured to define an external appearance, and the antenna may be provided on an inner surface of the outer lens.

According to the embodiment of the present disclosure, the antenna may include an antenna pattern formed on the inner surface of the outer lens.

In particular, the antenna pattern may be formed of a transparent electrode.

This is to ensure performance (electromagnetic wave transmitting/receiving performance) of the antenna pattern and to minimize a deterioration in light distribution performance and design characteristics of the lamp which is caused by applying the antenna pattern to the inner surface of the outer lens.

That is, since the antenna pattern is formed on the inner surface of the outer lens, it is possible to ensure spatial utilization and to transmit and receive the electromagnetic waves without signal interference caused by a metallic component or a metallic paint layer. However, because the light emitted from the lamp is blocked by the antenna pattern, there is a problem in that light distribution performance of the lamp deteriorates and design characteristics of the lamp deteriorate due to the antenna pattern exposed to the outside.

In contrast, according to the present disclosure, since the antenna pattern is formed of the transparent electrode, it is possible to obtain an advantageous effect of ensuring performance of the antenna pattern and minimizing a deterioration in light distribution performance and design characteristics of the lamp.

The transparent electrode may be made of various materials in accordance with required conditions and design specifications. For example, the transparent electrode may be made of at least any one of ITO, IZO, ATO, AZO, and metal nano fiber.

The antenna pattern may be formed in various ways in accordance with required conditions and design specifications.

For example, the antenna pattern may be formed by a step of forming a conductive thin film on the inner surface of the outer lens, a step of forming a mask pattern on a surface of the conductive thin film, and a step of partially removing the conductive thin film using the mask pattern.

In particular, the antenna pattern may be formed on the inner surface of the outer lens so as to perpendicular to a ground surface. Since the antenna pattern is formed to be perpendicular to the ground surface as described above, it is possible to obtain an advantageous effect of maximizing electromagnetic wave transmitting/receiving performance implemented by the antenna pattern.

According to the embodiment of the present disclosure, the signal processing module may be disposed below the antenna (i.e., disposed on the bottom in the lamp). Since the signal processing module is disposed below the antenna as described above, it is possible to obtain an advantageous effect of preventing a deterioration in performance of the antenna caused by the signal processing module and minimizing the exposure of the signal processing module to the outside.

More particularly, the signal processing module may be disposed below the light source.

This is based on the fact that in an internal space of the lamp having a sealed structure, a temperature in a space below the light source is relatively lower than temperatures in other spaces (e.g., a space between the light source and the inner lens). Since the signal processing module is disposed in the space below the light source where the temperature is lowest in the lamp, it is possible to obtain an advantageous effect of minimizing overheating of the signal processing module and improving stability and reliability.

According to the embodiment of the present disclosure, the antenna and the signal processing module may be electrically connected to each other by a connection member.

In particular, at least any one of a cable and a flexible board (FPCB) may be used as the connection member.

DETAILED DESCRIPTION

Figure 1:
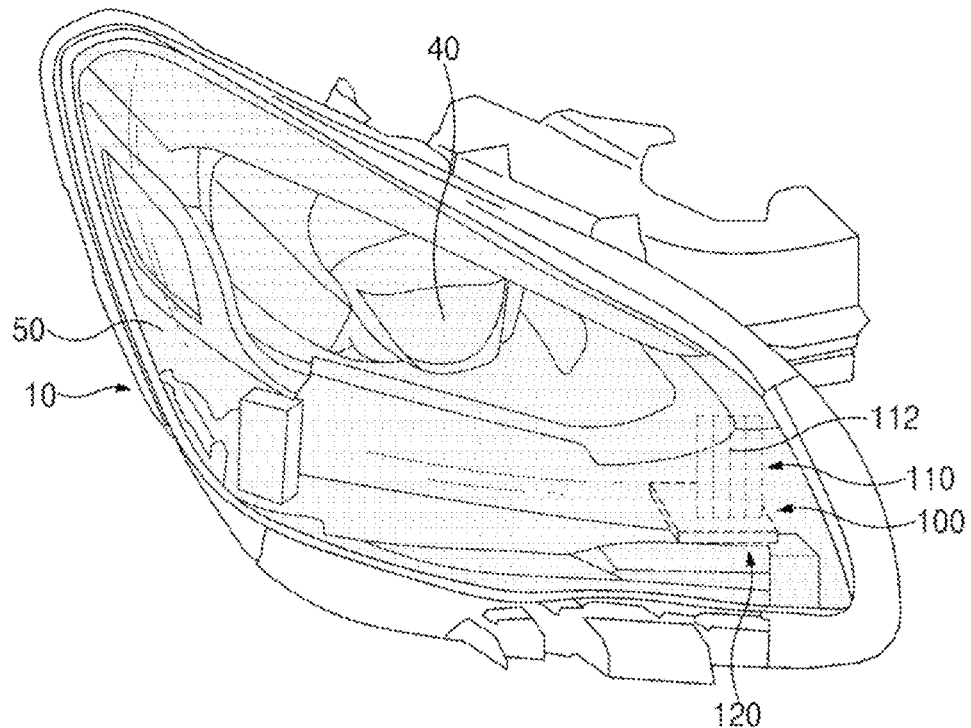
FIG. 1 is a view for explaining a lamp for a vehicle to which a radar device for a vehicle according to an embodiment of the present disclosure is applied.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiment of the present disclosure are for explaining the embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Referring to FIGS. 1 to 8, a radar device 100 for a vehicle according to the present disclosure includes an antenna 110 provided on an inner surface of a lamp 10 for a vehicle and configured to transmit and receive electromagnetic waves, and a signal processing module 120 provided in the lamp 10 for a vehicle and configured to process a signal received by the antenna 110.

For reference, the radar device 100 for a vehicle according to the embodiment of the present disclosure may be applied to the lamp 10 of various vehicles (e.g., passenger vehicles or vans) in accordance with required conditions and design specifications, and the present disclosure is not restricted or limited by the type of vehicle to which the radar device 100 for a vehicle is applied.

In addition, the lamp 10 for a vehicle in which the radar device 100 for a vehicle according to the embodiment of the present disclosure is mounted may be mainly used for a lighting function (e.g., headlamps or fog lamps) or for a signal function (e.g., turn signal lamps, tail lamps, brake lamps, or side markers), and the present disclosure is not restricted or limited by the use and the structure of the lamp 10 for a vehicle.

For example, the radar device 100 for a vehicle according to the embodiment of the present disclosure may be mounted in each of the headlamps 10 of the vehicle which are provided at a front left side and a front right side of the vehicle.

The structure of the lamp 10 for a vehicle may be variously changed in accordance with required conditions and design specifications.

Figure 2:
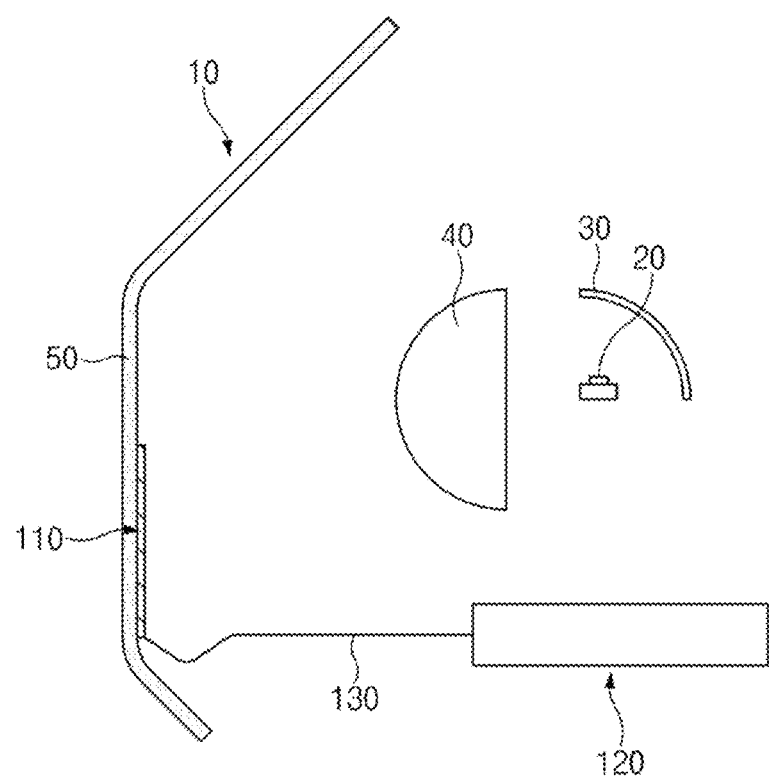
FIG. 2 is a view for explaining the radar device for a vehicle according to the embodiment of the present disclosure.
Figure 3:
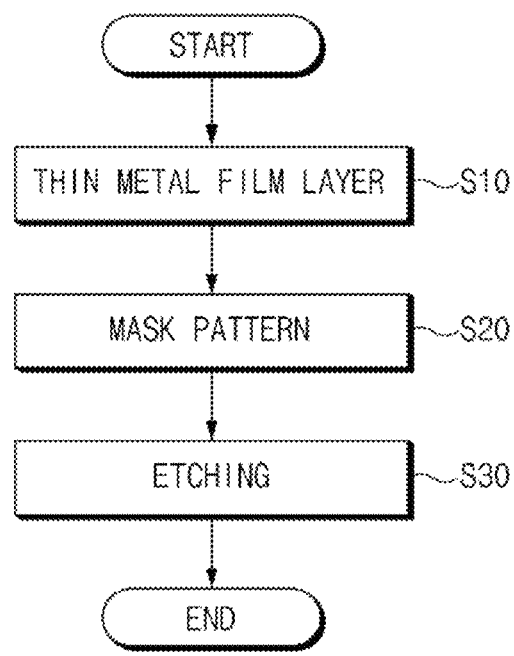
FIGS. 3 to 7 are views for explaining a process of manufacturing an antenna of the radar device for a vehicle according to the embodiment of the present disclosure.

For example, referring to FIGS. 1 and 2, the lamp 10 for a vehicle may include a light source 20, a reflector 30 configured to reflect, forward, the light emitted from the light source 20, an inner lens 40 configured to transmit, forward, the light reflected by the reflector 30, and an outer lens 50 provided in front of the inner lens 40 and configured to define an external appearance.

A light emitting diode (LED), which is a semiconductor light emitting element, may be used as the light source 20, or a plurality of LEDs configured to emit light beams with an identical color or different colors may be used in accordance with required conditions and design specifications. According to another embodiment of the present disclosure, a fluorescent lamp, an incandescent lamp, or a halogen lamp may be used as the light source.

The reflector 30 may have various structures capable of reflecting forward the light generated from the light source 20, and the present disclosure is not restricted or limited by the shape and the structure of the reflector 30.

For example, the reflector 30 may be formed to have an inner surface formed in the form of an elliptically curved surface or a free curved surface and having a reflective layer (reflective surface) so as to reflect the light generated from the light source 20 toward a location in front of the lamp 10 for a vehicle. Alternatively, the reflector 30 may have a structure having a single focal point or multiple focal points. In particular, the light source 20 may be disposed on the focal point of the reflector 30 or in the vicinity of the focal point of the reflector 30.

For reference, in the embodiment of the present disclosure, the configuration in which the reflector 30 reflects forward the light generated from the light source 20 may mean that the reflector 30 reflects the light in a direction in which the light is emitted from the lamp 10 for a vehicle. The direction represented by the forward direction may be changed in accordance with the installation position and direction of the lamp 10 for a vehicle.

The inner lens 40 is provided to transmit, forward, the light reflected by the reflector 30.

Various types of lenses capable of transmitting the light generated from the light source 20 to the outside may be used as the inner lens 40, and the present disclosure is not restricted or limited by the type and the structure of the inner lens 40. For example, a typical aspherical lens may be used as the inner lens 40.

The outer lens 50 is provided in front of the inner lens 40 in order to protect the light source 20 and components around the light source 20 from moisture, dust, and external impact and to define an external appearance.

The outer lens 50 may be made of a transparent or semi-transparent light transmissive material capable of transmitting the light, and the present disclosure is not restricted or limited by the material and the structure of the outer lens 50.

The antenna 110 is provided on the inner surface of the lamp 10 for a vehicle in order to transmit and receive the electromagnetic waves.

The antenna 110 may have various structures capable of transmitting and receiving the electromagnetic waves, and the present disclosure is not restricted or limited by the structure of the antenna 110 and the properties of the electromagnetic waves to be transmitted and received by the antenna 110.

For example, the antenna 110 may be provided to transmit and receive microwaves, which have wavelengths of approximately 10 cm to 100 cm, to/from the peripheral object.

In particular, the antenna 110 is provided on an inner surface of the outer lens 50 which faces the inner lens 40.

Since the antenna 110 is provided on the inner surface of the outer lens 50 as described above, it is not necessary to provide a separate space for mounting the antenna 110. As a result, it is possible to obtain an advantageous effect of simplifying a structure and improving a degree of design freedom and spatial utilization.

For example, the antenna 110 may include an antenna pattern 112 formed on the inner surface of the outer lens 50.

The antenna 110 may have various antenna patterns 112 capable of transmitting and receiving the electromagnetic waves in accordance with required conditions and design specifications, and the present disclosure is not restricted or limited by the structure and the arrangement of the antenna pattern 112.

For example, the antenna pattern 112 may be provided in the form of grouped parallel lines. In some instances, the antenna pattern 112 may be provided in the form of a single line or in other forms.

In particular, the antenna pattern 112 is formed of a transparent electrode.

This is to ensure performance (electromagnetic wave transmitting/receiving performance) of the antenna pattern 112 and to minimize a deterioration in light distribution performance and design characteristics of the lamp 10 which is caused by applying the antenna pattern 112 to the inner surface of the outer lens 50.

That is, since the antenna pattern 112 is formed on the inner surface of the outer lens 50, it is possible to ensure spatial utilization and to transmit and receive the electromagnetic waves without signal interference caused by a metallic component or a metallic paint layer. However, because the light emitted from the lamp 10 is blocked by the antenna pattern 112, there is a problem in that light distribution performance of the lamp 10 deteriorates and design characteristics of the lamp 10 deteriorate due to the antenna pattern 112 exposed to the outside.

However, according to the present disclosure, since the antenna pattern 112 is formed of the transparent electrode having a narrow width (e.g., a width of 10 μm or less or a width of several tens of micrometers), it is possible to obtain an advantageous effect of ensuring performance of the antenna pattern 112 and minimizing a deterioration in light distribution performance and design characteristics of the lamp 10.

The transparent electrode may be made of various materials in accordance with required conditions and design specifications, and the present disclosure is not restricted or limited by the material of the transparent electrode. For example, the transparent electrode may be made of at least any one of indium tin oxide (ITO), indium zinc oxide (IZO), antimony doped tin oxide (ATO), Al-doped zinc oxide (AZO), and metal nano fiber (e.g., silver nano fiber).

The antenna pattern 112 may be formed in various ways in accordance with required conditions and design specifications.

For example, referring to FIGS. 3 to 7, the antenna pattern 112 may be formed by a step S10 of forming a conductive thin film 110' on the inner surface of the outer lens 50, a step S20 of forming a mask pattern M on a surface of the conductive thin film 110', and a step S30 of partially removing the conductive thin film 110' using the mask pattern M.

Figure 4:
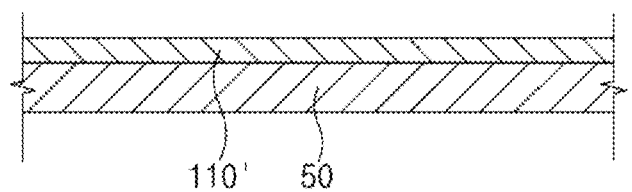
Figure 5:
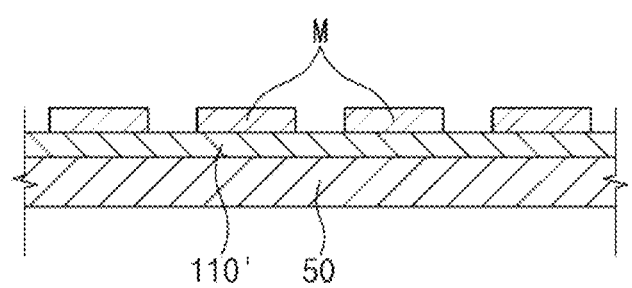
Figure 6:
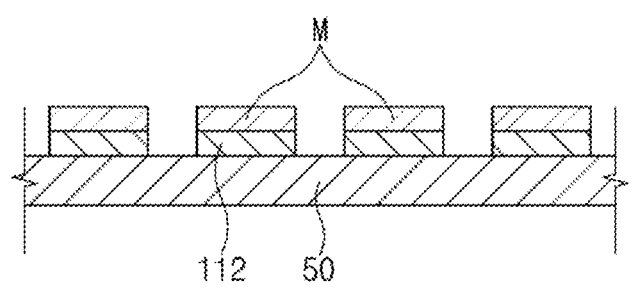
Figure 7:
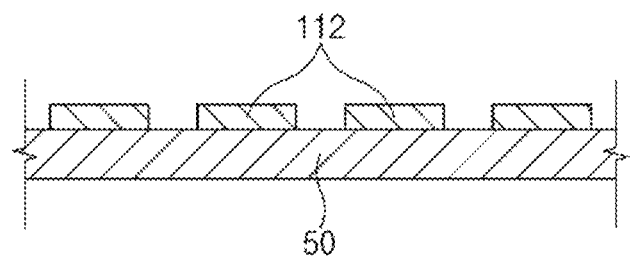

First, as illustrated in FIG. 4, the conductive thin film 110' (e.g., a thin metal film made of silver, copper, or ITO) is formed on the inner surface of the outer lens 50. Next, as illustrated in FIG. 5, the mask pattern M is formed on the surface (an upper surface based on FIG. 5) of the conductive thin film 110'. Next, as illustrated in FIG. 6, the antenna pattern 112 may be formed by partially removing the conductive thin film 110' using the mask pattern M (e.g., by etching a portion on which the mask pattern M is not formed). Finally, as illustrated in FIG. 7, the mask pattern M may be removed after the antenna pattern 112 is formed.

In the embodiment of the present disclosure illustrated and described above, the example in which the antenna pattern 112 is formed by etching has been described. However, according to another embodiment of the present disclosure, the antenna pattern 112 may be patterned on the inner surface of the outer lens 50 by printing or other methods.

In particular, the antenna pattern 112 is formed on the inner surface of the outer lens 50 so as to be perpendicular to the ground surface.

Since the antenna pattern 112 is formed to be perpendicular to the ground surface as described above, it is possible to obtain an advantageous effect of maximizing electromagnetic wave transmitting/receiving performance implemented by the antenna pattern 112.

Referring to FIGS. 1 and 2, the signal processing module 120 is provided in the lamp 10 for a vehicle in order to analyze and process a signal transmitted and received by the antenna 110 and to control the antenna 110.

The signal processing module 120 may include a central processing unit (CPU) or a semiconductor device that processes instructions stored in a memory and/or a storage. The memory and the storage may include various types of volatile or non-volatile storage media. For example, the memory may include a read only memory (ROM) and a random-access memory (RAM).

In particular, the signal processing module 120 is disposed below the antenna 110 (disposed on the bottom in the lamp 10). Since the signal processing module 120 is disposed below the antenna 110 as described above, it is possible to obtain an advantageous effect of preventing a deterioration in performance of the antenna 110 caused by the signal processing module 120 and minimizing the exposure of the signal processing module 120 to the outside.

More particularly, the signal processing module 120 is disposed below the light source 20.

This is based on the fact that in an internal space of the lamp 10 having a sealed structure, a temperature in a space below the light source 20 is relatively lower than temperatures in other spaces (e.g., a space between the light source 20 and the inner lens 40). Since the signal processing module 120 is disposed in the space below the light source 20 where the temperature is lowest in the lamp 10, it is possible to obtain an advantageous effect of minimizing overheating of the signal processing module 120 and improving stability and reliability.

Figure 8:
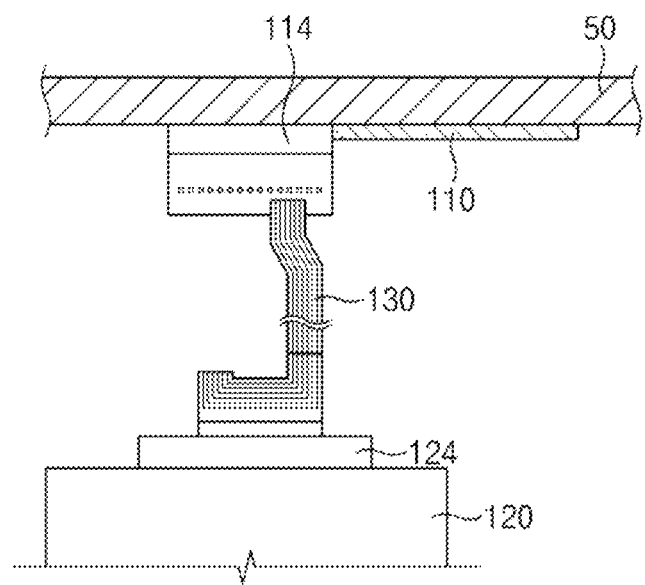
FIG. 8 is a view for explaining a connection member of the radar device for a vehicle according to the embodiment of the present disclosure.

Meanwhile, referring to FIGS. 2 and 8, the antenna 110 and the signal processing module 120 may be electrically connected to each other by a connection member 130.

In particular, at least any one of a flexibly bendable cable and a flexible board (FPCB) may be used as the connection member 130, and the present disclosure is not restricted or limited by the type and the structure of the connection member 130.

For example, referring to FIG. 8, a flexible board may be used as the connection member 130, one end of the connection member 130 may be electrically connected to the antenna pattern 112, and the other end of the connection member 130 may be electrically connected to the signal processing module 120.

The connection member 130 and the antenna pattern 112 (or the signal processing module) may be electrically connected to each other by means of a connector, a conductive adhesive, soldering, a conductive hook, or the like, and the present disclosure is not restricted or limited by the electrical connection structure between the connection member 130 and the antenna pattern 112 (or the signal processing module).

For example, connectors 114 and 124 may be connected to one end and the other end of the connection member 130, respectively, and the antenna 110 and the signal processing module 120 may be electrically connected to each other as the connectors 114 and 124 are coupled to terminal parts (not illustrated) connected to the antenna 110 and the signal processing module 120, respectively.

According to the exemplary embodiment of the present disclosure as described above, it is possible to obtain an advantageous effect of simplifying the structure and improving the degree of design freedom and spatial utilization.

In particular, according to the embodiment of the present disclosure, since the radar is mounted in the lamp for a vehicle, it is possible to obtain an advantageous effect of minimizing a space required to mount the radar and improving the degree of design freedom and spatial utilization.

In addition, according to the embodiment of the present disclosure, it is possible to obtain an advantageous effect of preventing a deterioration in design characteristics of the lamp for a vehicle, improving marketability, and enhancing consumer satisfaction.

While the embodiments have been described above, but the embodiments are just illustrative and not intended to limit the present disclosure. It can be appreciated by those skilled in the art that various modifications and alterations, which are not described above, may be made to the present embodiment without departing from the intrinsic features of the present embodiment. For example, the respective constituent elements specifically described in the embodiments may be modified and then carried out. Further, it should be interpreted that the differences related to the modifications and alterations are included in the scope of the present disclosure defined by the appended claims.

What is claimed is:

1. A radar device for a vehicle, the radar device comprising:
    an antenna provided on an inner surface of a lamp for a vehicle and configured to transmit and receive electromagnetic waves; and
    a signal processing module provided in the lamp and directly below a light source that is configured to process a signal received by the antenna.

2. The radar device of claim 1, wherein the lamp comprises:
    the light source configured to generate light; and
    an outer lens provided in front of the light source and configured to define an external appearance, and
    wherein the antenna is provided on an inner surface of the outer lens.

3. The radar device of claim 2, wherein the antenna comprises an antenna pattern formed on the inner surface of the outer lens.

4. The radar device of claim 3, wherein the antenna pattern is formed of a transparent electrode.

5. The radar device of claim 4, wherein the transparent electrode is made of at least one of ITO, IZO, ATO, AZO, or metal nano fiber.

6. The radar device of claim 4, wherein the antenna pattern is formed by a step of forming a conductive thin film on the inner surface of the outer lens, a step of forming a mask pattern on a surface of the conductive thin film, and a step of partially removing the conductive thin film using the mask pattern.

7. The radar device of claim 3, wherein the antenna pattern is formed on the inner surface of the outer lens so as to be perpendicular to a ground surface.

8. The radar device of claim 2, wherein the signal processing module is disposed below the antenna.

9. The radar device of claim 1, comprising:
    a connection member configured to electrically connect the antenna and the signal processing module.

10. The radar device of claim 9, wherein the connection member comprises at least one of a cable or a flexible board.

11. A radar device for a vehicle, the radar device comprising:
    an antenna provided on an inner surface of a lamp for a vehicle and configured to transmit and receive electromagnetic waves, wherein the antenna is perpendicular to a ground surface; and
    a signal processing module provided in the lamp and configured to process a signal received by the antenna.

* * * * *